United States Patent [19]

Fukui et al.

[11] Patent Number: 4,741,627

[45] Date of Patent: May 3, 1988

[54] ELECTRONIC THERMOMETER

[75] Inventors: Ryoichi Fukui, Matsuzaka; Susumu Minamikawa, Ise, both of Japan

[73] Assignee: Omron Tateisi Electronics Co., Kyoto, Japan

[21] Appl. No.: 810,232

[22] Filed: Dec. 17, 1985

[30] Foreign Application Priority Data

Dec. 18, 1984 [JP] Japan ................................. 59-267193
Dec. 18, 1984 [JP] Japan ................................. 59-267194

[51] Int. Cl.$^4$ ........................................... G01K 01/14
[52] U.S. Cl. ..................................... 374/208; 374/183
[58] Field of Search ..................... 374/208, 137, 158; 128/736; 206/306

[56] References Cited

U.S. PATENT DOCUMENTS

| | | | |
|---|---|---|---|
| 2,290,328 | 7/1942 | Hedfield et al. | 374/208 |
| 3,087,338 | 4/1963 | Horbinski et al. | 374/137 |
| 3,540,283 | 11/1970 | Dean | 374/158 X |
| 3,665,991 | 5/1972 | Gillemot et al. | 73/431 X |
| 3,822,598 | 7/1974 | Brothers et al. | 374/158 X |
| 3,822,783 | 7/1974 | Mortensen | 206/305 X |
| 3,824,860 | 7/1974 | Hardin | 73/431 |
| 3,946,613 | 3/1976 | Silver | 374/208 X |
| 4,050,493 | 9/1977 | Cho | 150/106 |
| 4,121,574 | 10/1978 | Lester | 128/736 |

Primary Examiner—Daniel M. Yasich
Attorney, Agent, or Firm—Wegner & Bretschneider

[57] ABSTRACT

An electronic clinical thermometer comprising a compact-like case, a cover pivotally connected to a side edge of the case by means of hinge members; a main body of the electronic thermometer fixedly secured to an inner bottom surface of the case and having a display field and a manipulating switch disposed on the top surface, a cord led outwardly from the main body through a peripheral wall thereof, a temperature sensing probe provided at the free end of the cord, and retaining means for releasably securing the temperature sensing probe within the case. The thermometer is suited for ladies' use is disclosed. A window can be formed in the cover to allow the display to be viewed therethrough even in the cover-closed state. A notch can be formed in a side wall of the case for guiding the cord.

4 Claims, 3 Drawing Sheets

ELECTRONIC THERMOMETER

BACKGROUND OF THE INVENTION

1. Field of the Invention

The present invention relates to an electronic thermometer such as a clinical thermometer suited particularly for ladies' use.

2. Description of the Prior Art

Clinical thermometers are known which are designed for ladies' use and comprise a temperature sensing probe electrically connected to a main body of the thermometer which include an electronic processing circuit. When in use, the temperature sensing probe is held under the tongue while observing a display incorporated in the main body of the thermometer. For this reason, it is necessary to connect the probe to the thermometer body through a relatively long cable or cord. When the clinical thermometer is not used, the temperature sensing probe as well as the connecting cable or cord has to be stored in a hygienic state. To this end, there is usually provided a case for accommodating both the thermometer body and the sensing probe together with the connecting cord.

The case is a secondary component which does not take part in the measurement of body temperature and is likely to be lost. However, once the case is lost, the temperature sensing probe is susceptible to be exposed to the unhygienic environment.

Since the ladies' clinical thermometer is naturally one of the lady's belongings, portability and small size are required in addition to its practicality as a measuring instrument. For example, it is desirable that the thermometer can be placed in a handbag. To this end, the thermometer should preferably be implemented in such configuration and size similar to those of articles for toilet purposes. Fashionability should also be taken into consideration in realizing the thermometer.

SUMMARY OF THE INVENTION

It is therefore an object of the present invention to provide an electronic clinical thermometer in which a thermometer body is provided with an inseparable case so that the measurement of body temperature is carried out by pulling out the sensing probe and the cord with a cover of the case being opened.

Another object of the invention is to provide an electronic clinical thermometer implemented in a configuration suited for a lady's belonging.

A further object of the present invention is to provide an electronic clinical thermometer of such a structure which allows the measurement of body temperature to be conducted in the state in which a cover of the case is closed.

In view of the above objects, there is provided according to an aspect of the invention an electronic clinical thermometer which comprises a compact-like case, a cover pivotally connected to a side edge of the case by means of hinge members, a main body of the electronic thermometer fixedly secured to an inner bottom surface of the case and having a display field and a manipulating switch disposed on the exposed surface, a cord or cable led outwardly from the main body through a peripheral wall thereof, a temperature sensing probe provided at the free end of the cord, and retaining means for releasably securing the temperature sensing probe within the case.

With the structure of the electronic clinical thermometer, the possibility of only the case being lost is excluded, while the probe can be stored in the hygienic state when the thermometer is not used.

Further, because of the compact-like configuration of the case, the clinical thermometer can enjoy an improved fashionability for use as ladies' thermometer.

More specifically, the ladies' clinical thermometer of this type requires in addition to the practicability as the instrument for measurement the easy portability, small size and fashionability, as desired hereinbefore. The electronic clinical thermometer according to the invention meets all of these requirements.

In a preferred embodiment of the invention a transparent window is provided in the cover so that the temperature as displayed can be read through the window. Thus, the measurement of body temperature as well as the reading of the result of measurement can be performed in the state in which the cover is closed, to another advantage.

Above and other objects, features and advantages of the present invention will be more apparent upon consideration of the following description of the preferred embodiments. The description mekes referred to the drawings.

DESCRIPTION OF THE PREFERRED EMBODIMENTS

Now, the invention will be described in detail in conjunction with exemplary embodiments thereof.

Figure 1:
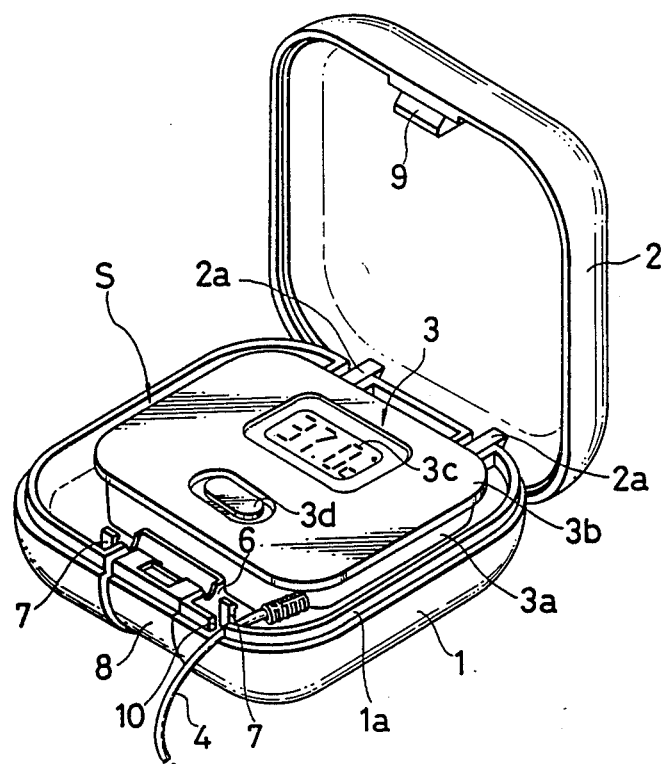
FIG. 1 is a perspective view showing an electronic thermometer according to a first embodiment of the invention in the state in which the thermometer is ready for use.
Figure 2:
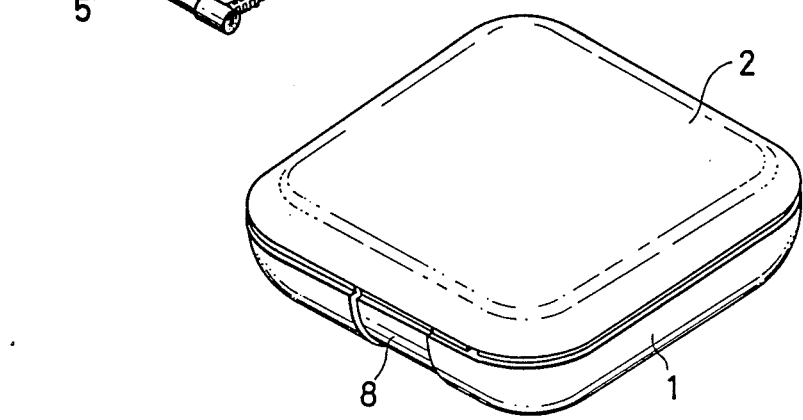
FIG. 2 is a perspective view showing the thermometer according to the first embodiment in the closed state for storage.

Referring to FIGS. 1 and 2, a ladies' clinical thermometer according to a first embodiment of the invention is composed of a compact-like case 1, a cover 2 pivotally connected to the case 1 at a side wall thereof by means of hinges 2a for opening and closing the case 1, a main body 3 of the thermometer fixedly secured to the inner bottom of the case substantially at the center thereof, an electric cord or cable conductor 4 capable of being led outwardly through a side wall of the thermometer body 3, and a temperature sensing probe 5 integrally connected to the free end of the cord in a substantially L-like configuration. The hinge 2a may be constituted by a thin resin-formed hinge.

The main body 3 of the thermometer body is composed of a flat box-like body portion 3a having a peripheral flange 3b formed integrally with the body portion 3a and extending outwardly flush with the top face of the body portion 3a, wherein a display device 3c and a set/reset switch 3d are mounted on the top surface of the body portion. The thermometer main body is positioned substantially at the center of the case 1 so that a gap S is formed between a side wall 1a and the thermometer body 3.

The cord 4 is taken out through a side wall of the body portion 3a and led out through a notch 10 formed in a side wall 1a of the case 1.

Terminal portions of conductors or wires of the cord or cable 4 are connected to an electric/electronic circuit housed within the main body at appropriate circuit points thereof by soldering or like means.

On the other hand, other terminal end portion of the conductors of the cable 4 are connected to lead wires (not shown) imbedded within the temperature sensing probe 5 by soldering or the like means.

Further, since the cord 4 has an actual length much greater than the one shown in the drawings, the cord 4 is adapted to be wound around the peripheral wall of the body portion 3a and held in the wound state by the flange 3b.

The temperature sensing probe 5 has a length shorter than the width of the case 1. In the stored state, the probe 5 is disposed on an upstanding holder 6 disposed on the inner bottom of the case 1 and is adapted to be fixedly locked by a pair of retaining claws 7 provided at both ends of the probe holder 6.

An unlocking button 8 is provided at a front wall of the case 1. Disposed in opposition to the button 8 is a locking lug 9 formed integrally with a front wall of the cover 2. When the cover 2 is closed to the case 1, the locking lug 9 is brought into engagement with the releasing button 8. On the other hand, when the unlocking button 8 is pressed in a one touch manner in the state shown in FIG. 2, the button 8 is disengaged from the locking lug 8, resulting in the cover 2 being positioned in a slightly opened state due to the fact that the unlocking button 8 slidably contacts with an outwardly tapered face to face of the locking lug 9.

When the cord 4 and the probe 5 are to be stored starting from the state shown in FIG. 1 in which the cord is led outwardly, the cord 4 is wound around the peripheral wall of the body portion 3a. Subsequently, the temperature sensing probe 5 is disposed on the holder 6 and pressed downwardly. Then, the retaining claws 7 will resiliently deform to pass therethrough the probe 5 and engage the outer peripheral portion thereof, whereby the probe 5 is stationarily stored. Cover 2 may then be closed. Ultimately, the thermometer assumes a compact-like outer appearance, as can be seen in FIG. 2.

Upon measurement of the body temperature, the unlocking button 8 is pressed to open the cover 2 fully, as shown in FIG. 1. The probe 5 is then taken out and the cord 4 is unwound to be led out.

The probe 5 is placed under the tongue, while the case is held by one hand to observe the content displayed by the display device 3c.

Figure 3:
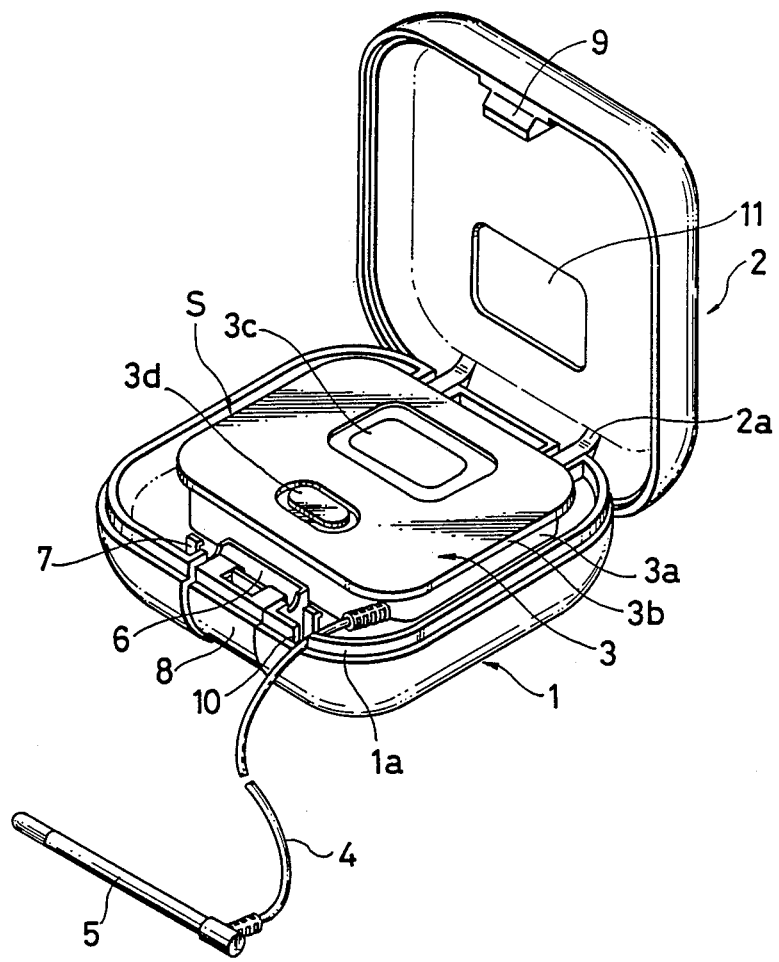
FIG. 3 is a perspective view similar to FIG. 1 and shows another embodiment of the present invention.
Figure 4:
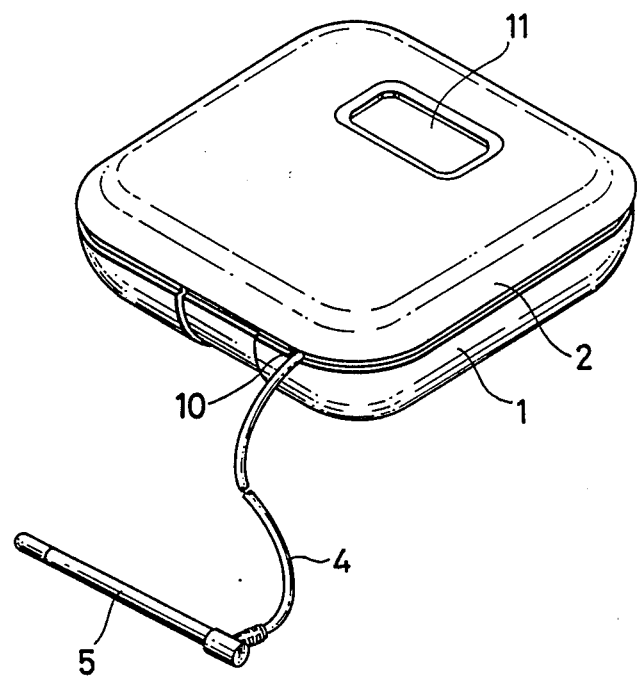
FIG. 4 is a perspective view showing the same with the cover being closed while a probe and a cord are pulled outwardly.

FIG. 3 and FIG. 4 show a ladies' clinical thermometer according to a second embodiment of the invention. This electronic thermometer is composed of a compact-like case 1, a cover 2 pivotally connected to the case 1 at a side wall thereof by means of hinges 2a for opening and closing the case 1, a main body 3 of the thermometer fixedly secured to the inner bottom of the case substantially at the center thereof, an electric cord or cable conductor 4 capable of being led outwardly through a side wall of the thermometer body, and a temperature sensing probe 5 integrally connected to the free end of the cord in a substantially L-like configuration. In the case of the second embodiment, a viewing window 11 is formed in the cover 2 in a shape substantially coinciding with the geometry of the temperature display field 3c so that the measured temperature can be observed through the window even in the closed state of the cover 2. In this respect, the second embodiment differs from the first embodiment. The window should preferably be covered with a transparent plate such as plastic plate to thereby protect the internal structure.

With the structure of the clinical thermometer described above, the unlocking button 8 is pressed upon use of the thermometer. The cover 2 is brought to the slightly opened state spontaneously. When taking out the probe 5 and unwinding the cord 4, the cover 2 is opened fully to the state shown in FIG. 3. The cord 4 is inserted within the notch 10 formed in a side wall 1a of the case 1. After operation of manual switch 3d, the cover 2 is again closed to the state illustrated in FIG. 4 in which the cord 4 and the probe 5 are located outside of the closed case 1. The temperature display 3c can however be observed through the viewing window 11.

The probe 5 is held under the tongue of the user in the course of measurement of the body temperature, the result of which can be observed on the display 3c through the viewing window 11.

In the foregoing, the invention has been described in conjunction with the illustrative embodiments thereof. It should however be understood that the invention is never restricted to it. Various modifications and changes in design will readily occur to those skilled in the art without departing from the spirit and scope of the invention set forth in the annexed claims.

What is claimed is:

1. An electronic thermometer, comprising:
   a compact-like case;
   a cover pivotally connected to a side edge of the case by hinge means;
   a thermometer main body fixedly mounted on the inner bottom portion of the case and having a temperature display and a manipulating switch disposed on a top surface, wherein the manipulating switch is a set/reset switch;
   a cord extending through a notch in said main body and led outwardly from the thermometer main body even when the cover is closed and accommodated inside a gap formed between the inner wall of the bottom portion of the case, said cord being the thermometer main body;
   a temperature sensing probe mounted on the free end of the cord so as to be electrically coupled to an electric/electronic circuit incorporated in the main body; and
   a retaining means for releasably securing the temperature sensing probe within the gap of the case.

2. An electronic thermometer, comprising:
   a compact-like case having a first locking means and a notch at a first side wall thereof;
   a cover pivotally connected to a second side wall of the case by hinge means, and having a second locking means at a front wall and corresponding to the first side wall of the case for a one touch releasable engagement with the first locking means when the cover is shut;
   a thermometer main body fixedly mounted on the inner bottom of the case and having a temperature display and a manipulating switch disposed on a top surface, wherein the manipulating switch is a set/reset switch;
   a cord led outwardly from the thermometer main body and extending through the notch even when the cover is closed, said cover being stored in the case in a manner that the cord is wound around the peripheral wall of the thermometer main body;

a temperature sensing probe mounted on a free end of the cord so as to be electrically coupled to an electric/electronic circuit incorporated in the main body; and a retaining means disposed on the inner bottom of the case for releasably securing the temperature sensing probe within the case.

3. An electronic thermometer according to claim 1 or 2, wherein the cover is provided with a window for allowing the temperature display to be observed therethrough in the state in which the cover is closed, and a notch for guiding the cord is formed in a side wall of the case.

4. An electronic thermometer according to claim 1 or 2, wherein, said thermometer main body is disposed within said case with a gap being formed between said main body and side walls of said case.

* * * * *